United States Patent Office 3,521,823
Patented July 28, 1970

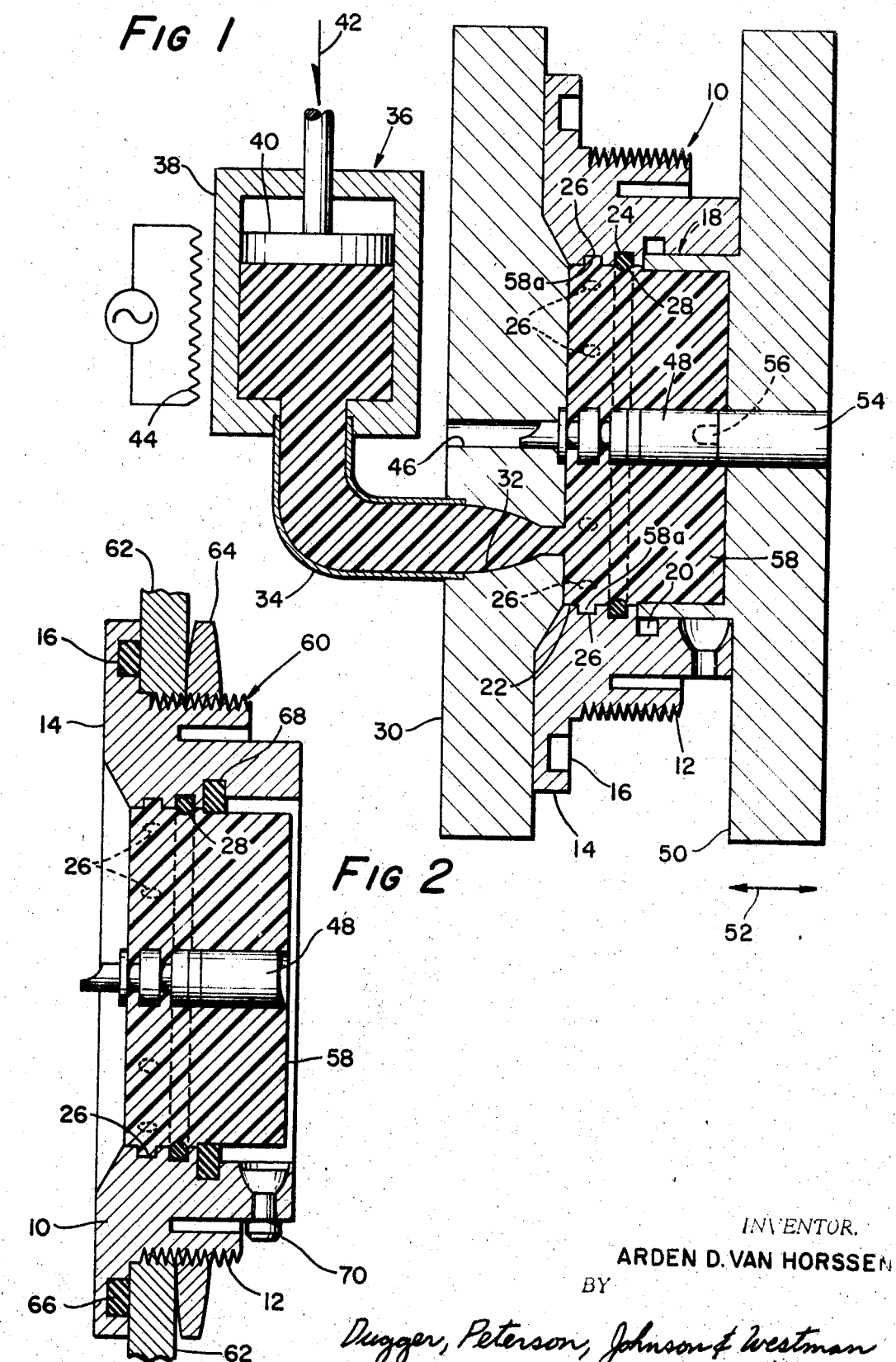

3,521,823
METHOD OF MAKING A SEALED ELECTRICAL CONNECTOR COMPONENT
Arden D. Van Horssen, Minneapolis, Minn., assignor to United-Carr, Incorporated, Boston, Mass., a corporation of Delaware
Filed July 19, 1968, Ser. No. 746,226
Int. Cl. H01r 13/52
U.S. Cl. 339—218                              4 Claims

ABSTRACT OF THE DISCLOSURE

A metal shell has an internal circumferential groove formed therein for the accommodation of a silicone rubber O-ring, the O-ring being of a size so that a portion thereof projects inwardly into the shell's bore. The shell and its O-ring, together with one or more electrical contacts, are placed in a mold assembly and glass-filled epoxy resin is introduced under sufficient pressure so as to compress the O-ring. When the resin cools and sets, it shrinks sufficiently so as to allow the O-ring to expand partially but not completely. In this way, an effective barrier is provided which prevents the passage of air or moisture. Because of the shrinkage, the contact element itself is contractively gripped and held by the hardened epoxy resin. Also, a plurality of angularly spaced recesses are formed in the cylindrical inner wall surface so that some of the resin flows into the recesses and thereby precludes any relative rotation between the set plastic material and the shell.

BACKGROUND OF THE INVENTION

Field of the invention

This invention relates generally an electric connector component that is air-proof or moisture-proof and also pertains more particularly to the method of making such a connector component.

Description of the prior art

Various types of sealed electrical connectors have been developed. For the most part, these connectors fall into two categories. The first involves the utilization of rubber or bonding material with a corresponding increase in cost, even then the adding of rubber or bonding material not being completely dependable in all situations to provide an effective seal. The other category that has been mentioned requires complicated machining which can be quite expensive and at times difficult to accomplish where an intricate labyrinth must be provided to resist the passage of air or moisture.

SUMMARY OF THE INVENTION

The present invention envisages the utilization of a metallic shell that is formed with an internal circumferential groove. The groove contains an elastomeric O-ring that is inserted therein and which is of a size such that a portion thereof projects inwardly from the inner wall surface. When a shrinkable plastic material, such as a glass-filled epoxy resin, is introduced into the shell under pressure, it will compress the O-ring to some extent and then when the resin hardens the shrinkage thereof will allow the O-ring to expand partially but not to its fullest extent. Hence, the O-ring is held captive under some pressure and therefore a highly effective seal results. The same epoxy resin also contracts and thereby grips and holds one or more contact elements that have been properly positioned prior to the introduction of the resin. Still further, it is contemplated that the resin enter a series of angularly spaced recesses formed in the inner wall of the shell and thus provide resistance against relative rotation of the hardened resin with respect to the outer shell.

Accordingly, the invention has for an object the fabrication of a low cost connector component that requires no complex machining or forming techniques, and which contains a permanently installed barrier that is constantly maintained under sufficient pressure so that leakage is obviated.

BRIEF DESCRIPTION OF THE DRAWING

FIG. 1 is a sectional view through a mold assembly illustrating the introduction of plastic material under pressure which compresses the rubber O-ring that thereafter provides the desired sealing action, and
FIG. 2 is a sectional view picturing the actual mounting of a connector component fabricated in accordance with the teachings of my invention.

DESCRIPTION OF THE PREFERRED EMBODIMENT

Referring first to FIG. 1, a metallic shell 10 has been depicted. This shell may be of aluminum or other metal, the particular metal being unimportant to the present invention. The shell as shown has external threads 12 thereon and also has an external flange 14 which contains an annular groove 16.

The shell 10 has a generally cylindrical bore 18 formed with a first circumferential groove 20 for the accommodation of a gasket hereinafter referred to. Also, the shell 10 has an inner cylindrical wall surface labeled 22, the wall surface being of slightly less diameter than the larger portion of the bore 18. The wall surface 22 is provided with a circumferential groove 24 and also a plurality of angularly spaced recesses 26.

The circumferential groove 24 is of a size so as to receive partially therein an elastomeric O-ring 28. From FIG. 1 it will be discerned that the groove 24 has a depth somewhat greater than the radius of the O-ring 28 so that approximately one-third of the ring projects inwardly beyond the surface 22. A silicone rubber has been found satisfactory as the specific material for the O-ring 28. However, both natural and synthetic rubbers of various types are envisaged as long as the material is compressible to an extent that will be made manifest as the description progresses. A silicone rubber has the added characteristic of resisting heat which is necessary in the practice of the invention.

A mold assembly has been illustrated in FIG. 1, being comprised of a fixed die 30 having a sprue gate 32 via which a plastic material enters the shell 10. A supply tube 34 connects with the sprue gate 32 and conveys the plastic material from an injection machine designated generally by the reference numeral 36. Actually, the injection machine 36 is only schematically presented inasmuch as these machines are quite widely used. At any rate, the machine 36, as illustrated, includes a cylinder 38 and a ram 40, molding pressure being applied to the ram in the direction of the arrow 42. An electric heater 44 diagrammatically appears alongside the cylinder 38, being part of the injection machine 36 for the purpose of maintaining the plastic material in a molten condition.

There is a clearance hole 46 formed in the die 30 so as to receive and hold one end of an electrical contact element 48. It will be appreciated that the contact element 48 will be inserted or placed within the bore 18 of the shell 10 prior to the introduction of any plastic material. The particular number of contact elements 48 will depend upon the use to which the completed connector component is to be put.

The mold assembly further includes a movable die 50, the die 50 actually being reciprocal in the direction indicated by the double-headed arrow 52. The die 50 contains a mold core pin 54 that positions the contact element 48, the pin 54 having a tip 56 shown in phantom outline that extends into the right end of the contact element 48.

In actual practice, the mold assembly would be turned through 90° so that the die 30 is lowermost, but it is believed of some help to have the shell 10 oriented in the same direction as it is apt to be used, one such use appearing in FIG. 2.

A thermosetting plastic material, more specifically, glass-filled epoxy resin, has been labeled 58, being fed into the mold cavity via the sprue agte 32. A number of types of rubber are capable of being compressed to one-third the volume that they normally occupy. Hence, the shrinkage factor rate of the alluded-to plastic material need not be great as long as the rubber constituting the O-ring 28 is compressed to a greater degree than the total shrinkage that ensures as the plastic material 58 sets or hardens. Sufficient pressure can be applied via the ram 40 for the specific elastomeric material that is selected for the O-ring 28 in order to obtain enough O-ring compression. In other words, the plastic material 58 shrinks as it cools and sets, thereby allowing the O-ring 28 to expand somewhat from its compressed condition but not to its normal or free volumetric state. Not only does the plastic material 58 allow the O-ring 28 to expand partially but as the plastic material cools and sets, it contracts about the contact element 48 and thereby grips and holds the contact element 48. Still further, the provision of the recesses 26 allow small amounts of the material 58 to flow thereinto, and the lugs thus formed have been designated 58a. It is obvious from the configuration of the movable die 50 that a cavity is provided so that the plastic material 58 when it hardens will have a definite shape imparted thereto.

The finished connector component, which now includes the shell 10, the contact element 48, and the hardened epoxy resin 58, has been given the reference numeral 60 and appears in FIG. 2. Since the purpose of the invention is to provide an electrical connector component that will be impervious to air and moisture, the component 60 has been shown attached to an aperture bulkhead 62, only a fragment thereof being depicted. A nut 64 threaded on the shell 10, the external threads 12 accommodating the nut 64, draws the flange 14 tightly against the side of the bulkhead opposite the nut 64. Preferably, a gasket 66 is placed in the annular groove 16 so as to provide adequate sealing action in this area. Also, since it is contemplated that a mating electrical element will be received in the right end of the contact element 48, such element in many instances having a protective shroud thereabout, there is an additional gasket 68 disposed so that the end of such shroud will bear thereagainst. A coupling pin 70 will hold the shroud in place to effect the coupling of the two mated components.

From the information that has been given, the attributes of my invention should be readily apparent. The sealing action is provided by the expansion of the O-ring 28 after having been initially compressed by the pressure applied to the plastic material 58 by the injection machine 36. The amount of expansion is determined by the total shrinkage of the glass-filled epoxy resin 58, so the initial amount of compression must be greater than this shrinkage. Also, the single contact element 48 that has been presented is contractively held by the material 58 because of its shrinkage thereagainst. Owing to the presence of the various recesses 26, will be understood that the material 58 flows into these recesses and that when it becomes hardened the lugs 58a are formed. In this way, any twisting action or torque applied to either the shell 10 or the hardened plastic 58 does not result in relative rotation between these members, any tendency to rotate being prevented by the lugs 58a. Due to the resilient barrier provided by the rubber O-ring 28, there is no way for air or moisture to flow from one side of the bulkhead 62 to the other. At the same time, the contact element 48 is securely held in place by the same plastic material 58 that maintains the O-ring 28 under at least some compression, the amount being controllable by the amount of shrinkage of the plastic material 58 and the material constituting the O-ring 28.

I claim:

1. A method of making a sealed electrical connector component comprising the steps of inserting an elastomeric ring in a groove formed in the interior of a shell member, said ring being of a size such that a portion thereof projects inwardly, placing at least one contact element within the interior of said shell member and in a spaced relation therewith and also in a spaced relation with said ring, and introducing a shrinkable plastic material into said shell member under enough pressure to compress said ring sufficiently so that when said plastic material shrinks, said ring is maintained in a compressed condition.

2. The method of making a sealed connector in accordance with claim 1 in which said shell member is metal, said ring is rubber, and said plastic material is a thermosetting compound having a shrinkage less than the extent to which said ring is compressed.

3. The method of making a sealed connector in accordance with claim 2 in which said thermosetting compound is a glass-filled epoxy resin.

4. The method of making a sealed connector in accordance with claim 3, in which said metal shell member is formed with a plurality of angularly spaced recesses into which said glass-filled epoxy resin flows.

References Cited

UNITED STATES PATENTS

| | | | |
|---|---|---|---|
| 2,383,926 | 8/1945 | White. | |
| 2,590,160 | 3/1952 | Dixon | 174—138 |
| 2,740,098 | 3/1956 | Phillips | 339—94 |
| 2,949,642 | 8/1960 | Lieberman | 18—59 |
| 3,441,898 | 4/1969 | Modfelt | 339—48 |

FOREIGN PATENTS

| | | |
|---|---|---|
| 568,596 | 4/1945 | Great Britain. |

RICHARD E. MOORE, Primary Examiner

J. H. McGLYNN, Assistant Examiner

U.S. Cl. X.R.

174—76